(12) United States Patent
Koshigoe et al.

(10) Patent No.: US 9,138,833 B2
(45) Date of Patent: Sep. 22, 2015

(54) ALUMINUM ALLOY BRAZING SHEET AND METHOD FOR PRODUCING THE SAME

(75) Inventors: Fumihiro Koshigoe, Moka (JP); Toshiki Ueda, Moka (JP); Shimpei Kimura, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 80 days.

(21) Appl. No.: 12/528,807

(22) PCT Filed: Mar. 11, 2008

(86) PCT No.: PCT/JP2008/054393
§ 371 (c)(1),
(2), (4) Date: Aug. 27, 2009

(87) PCT Pub. No.: WO2008/126569
PCT Pub. Date: Oct. 23, 2008

(65) Prior Publication Data
US 2010/0101688 A1 Apr. 29, 2010

(30) Foreign Application Priority Data

Mar. 29, 2007 (JP) .................................. 2007-089924

(51) Int. Cl.
*B32B 15/20* (2006.01)
*B32B 15/01* (2006.01)
(Continued)

(52) U.S. Cl.
CPC .......... *B23K 35/286* (2013.01); *B23K 35/0238* (2013.01); *B23K 35/22* (2013.01); *B23K 35/40* (2013.01); *B32B 15/016* (2013.01); *C22C 21/00* (2013.01); *C22C 21/14* (2013.01); *C22F 1/04* (2013.01); *C22F 1/043* (2013.01); *C22F 1/05* (2013.01); *F28F 21/089* (2013.01)

(58) Field of Classification Search
USPC .................................................. 428/654, 220
IPC ................. B23K 35/286,35/0238, 35/22, 35/40
See application file for complete search history.

(56) References Cited

U.S. PATENT DOCUMENTS

| 5,021,106 A | 6/1991 | Iwai et al. |
| 7,387,844 B2 | 6/2008 | Ueda et al. |
| 2004/0028940 A1 | 2/2004 | Toyama et al. |
| 2006/0134451 A1 | 6/2006 | Saisho et al. |

(Continued)

FOREIGN PATENT DOCUMENTS

| CN | 1129258 A | 8/1996 |
| EP | 0514946 A2 | 11/1992 |

(Continued)

*Primary Examiner* — Roy King
*Assistant Examiner* — Janelle Morillo
(74) *Attorney, Agent, or Firm* — Oblon, McClelland, Maier & Neustadt, L.L.P.

(57) ABSTRACT

Disclosed is an aluminum alloy brazing sheet for heat exchanger which excels in resistance to corrosion from its inside and simultaneously attains satisfactory erosion resistance and high strength. This includes a core material of an Al alloy containing predetermined amounts of Si, Mn, Cu, Mg, and Ti; a clad material of an Al alloy containing predetermined amounts of Si, Mn, and Zn, having a predetermined thickness, and lying on one side of the core material so as to constitute an inner side of a tube member of the heat exchanger; and a filler material of an Al alloy containing a predetermined amount of Si, having a predetermined thickness, and lying on the other side of the core material so as to constitute an outer side of the tube member. The crystal grain size of the core material after brazing under specific conditions is 50 μm or more but less than 300 μm in a rolling direction.

6 Claims, 1 Drawing Sheet

(51) Int. Cl.
  *B23K 35/28* (2006.01)
  *B23K 35/02* (2006.01)
  *B23K 35/22* (2006.01)
  *B23K 35/40* (2006.01)
  *C22C 21/00* (2006.01)
  *C22C 21/14* (2006.01)
  *C22F 1/04* (2006.01)
  *C22F 1/043* (2006.01)
  *C22F 1/05* (2006.01)
  *F28F 21/08* (2006.01)

(56) References Cited

U.S. PATENT DOCUMENTS

2007/0246509 A1* 10/2007 Koshigoe et al. ............. 228/101
2009/0020276 A1   1/2009 Ueda et al.
2009/0078398 A1   3/2009 Ueda et al.

FOREIGN PATENT DOCUMENTS

| EP | 1666190 A1 | 6/2006 |
| EP | 2085214 A1 | 8/2009 |
| EP | 2103702 A1 | 9/2009 |
| EP | 2128286 A1 | 12/2009 |
| JP | 2 290939 | 11/1990 |
| JP | 08060280 A | 3/1996 |
| JP | 8 246117 | 9/1996 |
| JP | 2000 351092 | 12/2000 |
| JP | 2004 17116 | 1/2004 |
| JP | 2004 84060 | 3/2004 |
| JP | 3536065 | 6/2004 |
| JP | 2005 232506 | 9/2005 |
| JP | 2005232506 A * | 9/2005 |
| JP | 2006 15376 | 1/2006 |
| WO | WO 2006/043137 A1 | 4/2006 |
| WO | WO 2006043137 A1 * | 4/2006 |

* cited by examiner

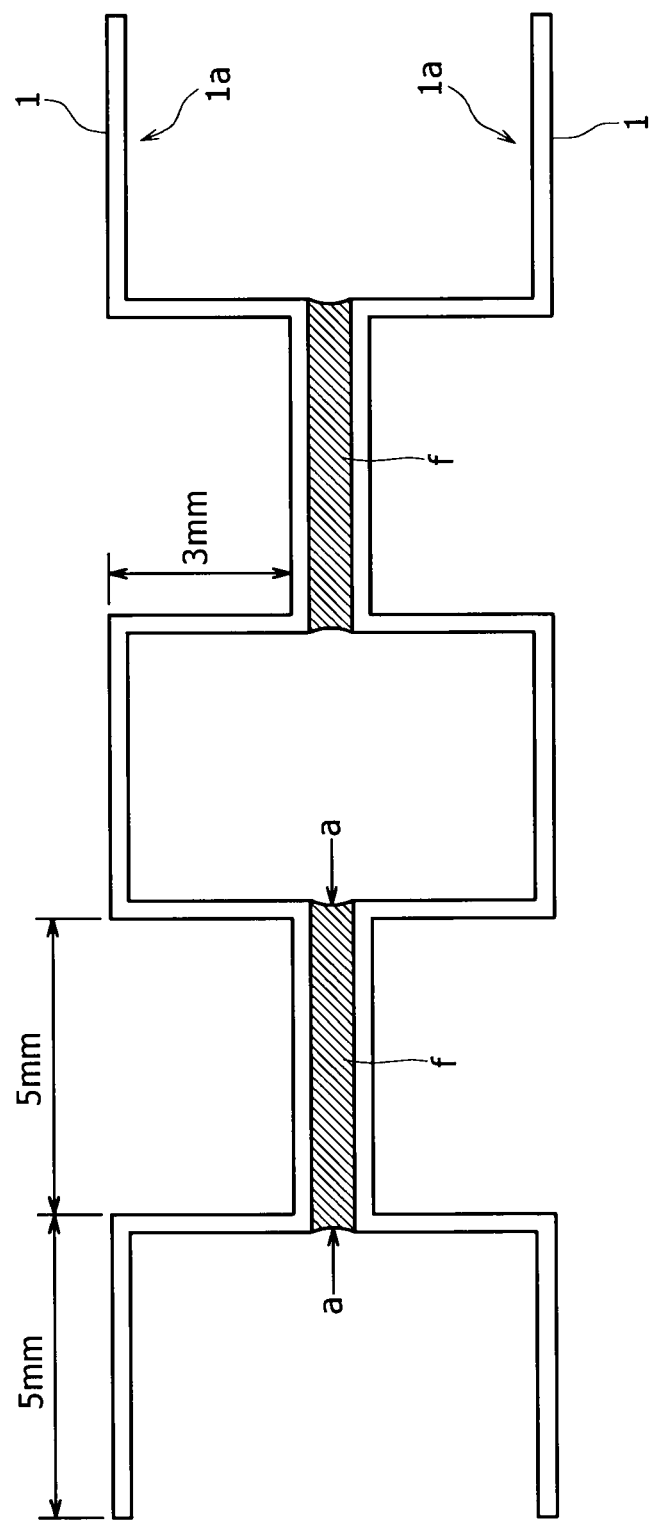

ALUMINUM ALLOY BRAZING SHEET AND METHOD FOR PRODUCING THE SAME

TECHNICAL FIELD

The present invention relates to aluminum alloy brazing sheets for use typically in automobile heat exchangers.

BACKGROUND ART

Heat exchangers such as radiators to be mounted in automobiles are produced by assembling tube members and fin members, each formed from brazing sheets composed of aluminum alloys; and brazing these members to give an assembly. For reducing the weights of such heat exchangers, the aluminum alloy brazing sheets have had a smaller and smaller gage, whereby have been required to have higher strength and higher corrosion resistance. For example, common aluminum alloy brazing sheets for tube members have a reduced sheet thickness of about 0.17 mm, whereas former ones have had a sheet thickness of about 0.20 mm.

There are known techniques relating to aluminum alloy brazing sheets excellent in corrosion resistance. Typically, Patent Document 1 discloses an aluminum alloy brazing sheet of a three-layer structure including an Al—Mn—Cu alloy core material, an Al—Zn alloy sacrificial anode material (clad material) lying on one side of the core material, and a filler material lying on the other side of the core material. A sacrificial effect can be imparted to the clad material by cladding a Zn-containing clad material on one side of a Cu-containing core material as above. The resulting laminate is formed into a tube member so that the clad material faces inward, to thereby improve the corrosion resistance against the coolant passing through inside the tube member. Additionally, the brazing sheet as the tube member is suitable for brazing with a fin member, because the filler material is cladded on the other side of the core material, i.e., on the outer surface of the tube member.

One of factors important to improve the corrosion resistance of the brazing sheet is erosion resistance, by which the erosion of the brazing filler into the core material during brazing of the brazing sheet is suppressed so as to prevent the core material from locally reducing its thickness. Typically, Patent Document 2 discloses a technique in which crystal grain boundaries of the core material are decreased by controlling the average grain size of the core material after brazing to 300 μm or more, because such crystal grain boundaries often allow the brazing filler to enter therethrough into the core material.

Patent Document 1: Japanese Patent No. 3536065 (Paragraphs 0007 to 0012)
Patent Document 2: Japanese Unexamined Patent Application Publication (JP-A) No. 2004-17116 (Paragraphs 0007 to 0008)

DISCLOSURE OF INVENTION

Problems to be Solved by the Invention

However, the core material disclosed in Patent Document 2 has an excessively large grain size and thereby causes the strength after brazing to become poor. Additionally, since a homogenization treatment of the core material is not performed in order to increase the grain size, added elements in the core material remain as being segregated during cladding and rolling for the production of a brazing sheet. As a result, the segregation causes the brazing sheet to melt locally during brazing.

Under these circumstances the present invention has been made, and an object thereof is to provide an aluminum alloy brazing sheet that has satisfactory corrosion resistance and erosion resistance and also has high strength after brazing, even if having a smaller sheet thickness.

Means for Solving the Problems

To achieve the object, the present inventors have specified a core material to have a grain size of 50 μm or more but less than 300 μm so as to have satisfactory erosion resistance and sufficient strength after brazing. They have also found a method for controlling the core material to have the above-specified grain size while specifying conditions for allowing the core material having the specific grain size to maintain satisfactory erosion resistance. The present invention has been made based on these findings.

Specifically, the present invention provides an aluminum alloy brazing sheet which includes a core material, a clad material, and a filler material, the core material containing Si in a content of 0.5 to 1.1 percent by mass, Mn in a content of 0.6 to 2.0 percent by mass, Cu in a content of 0.5 to 1.1 percent by mass, Mg in a content of 0.05 to 0.45 percent by mass, and Ti in a content of 0.05 to 0.25 percent by mass, with the remainder including aluminum and inevitable impurities; the clad material lying on one side of the core material, having a thickness of from 25 to 50 μm, and containing Si in a content of more than 0.5 percent by mass but 1.1 percent by mass or less, Mn in a content of 0.01 to 1.7 percent by mass, and Zn in a content of 3.0 to 6.0 percent by mass, with the remainder including aluminum and inevitable impurities; and the filler material lying on the other side of the core material, having a thickness of from 36 to 55 μm, and containing Si in a content of 7.0 to 12 percent by mass, with the remainder including aluminum and inevitable impurities, in which the core material has a grain size of 50 μm or more but less than 300 μm in a rolling direction after the aluminum alloy brazing sheet is subjected to brazing at a temperature of from 580° C. to 610° C. for 3 to 10 minutes.

The aluminum alloy brazing sheet can have erosion resistance and strength after brazing both at satisfactory levels by controlling the grain size of the core material and the contents of the added components in the respective layers as above. The aluminum alloy brazing sheet, when used typically in a radiator, can also prevent corrosion by a coolant from inside of the radiator, because the clad material facing the inside has satisfactory corrosion resistance. Even when the core material further contains magnesium (Mg), the aluminum alloy brazing sheet can ensure sufficient brazing performance by controlling the thickness of the filler material. The aluminum alloy brazing sheet allows the clad material to show a sufficient sacrificial effect by controlling the thickness of the clad material.

The conditions and parameters are specified as above, because the present invention relates to the improvement of strength after brazing, and it is considered to be reasonable that conditions and parameters are specified in the structure (texture) after brazing is performed under standard brazing conditions.

In another embodiment, the present invention provides a method for producing the aluminum alloy brazing sheet. The method includes a homogenization treatment step for homogenizing a slab for the core material through a heat treatment at a temperature of 440° C. to 570° C. for 4 hours or longer; a hot rolling step for cladding the core material slab obtained in the homogenization treatment step with a rolled sheet for the clad material and with a rolled sheet for the filler material through hot rolling; a cold rolling step for rolling the hot rolled sheet of a laminate structure obtained in the hot rolling step to a predetermined sheet thickness through cold working; an intermediate annealing step for annealing the rolled sheet of a laminate structure obtained in the cold rolling step; and a finish cold rolling step for rolling the rolled sheet of a laminate structure after the intermediate annealing step at a cold working ratio of 20% to 65% to a sheet thickness of 0.3 mm or less through cold working.

The core material can have a grain size of 50 μm or more but less than 300 μm in the rolling direction after brazing, by producing the aluminum alloy brazing sheet under the above-specified conditions.

In the production method of the aluminum alloy brazing sheet, finish annealing at a temperature of 200° C. to 320° C. for 5 hours or shorter is preferably performed after the finish cold rolling step.

The finish annealing allows the aluminum alloy brazing sheet to have superior formability.

Effects of the Invention

The aluminum alloy brazing sheet according to the present invention excels in erosion resistance and can maintain sufficient brazing performance (including strength after brazing) and high corrosion resistance, even if having a smaller sheet thickness.

The production method according to the present invention can produce an aluminum alloy brazing sheet that excels in erosion resistance and has sufficient brazing performance (including strength after brazing) and high corrosion resistance even when having such a small thickness as to be suitable for forming.

The method, if further including finish annealing, can give an aluminum alloy brazing sheet having further superior formability.

BRIEF DESCRIPTION OF DRAWINGS

FIG. 1 shows how the brazing performance is evaluated in Examples.

BEST MODES FOR CARRYING OUT THE INVENTION

Best modes for realizing aluminum alloy brazing sheets according to the present invention will be described below.

An aluminum alloy brazing sheet according to an embodiment of the present invention includes an aluminum alloy core material; a clad material cladded on one side of the core material; and a filler material cladded on the other side of the core material. When a tube member of a heat exchanger is prepared from the aluminum alloy brazing sheet according to this embodiment, the clad material constitutes the inner wall of the tube member.

Respective components constituting the aluminum alloy brazing sheet according to the present invention will be described below.

(Core Material)

The core material contains Si in a content of 0.5 to 1.1 percent by mass, Mn in a content of 0.6 to 2.0 percent by mass, Cu in a content of 0.5 to 1.1 percent by mass, Mg in a content of 0.05 to 0.45 percent by mass, and Ti in a content of 0.05 to 0.25 percent by mass, with the remainder including aluminum and inevitable impurities. Though not especially limited, the thickness of the core material in the aluminum alloy brazing sheet according to the present invention is preferably from 50% to 80% of the total thickness of the brazing sheet.

[Si in Core Material: 0.5 to 1.1 Percent by Mass]

Silicon (Si), if in coexistence with manganese (Mn), forms an Al—Mn—Si intermetallic compound that finely disperses in the grains to thereby contribute to dispersion strengthening. Silicon, if in coexistence with magnesium (Mg), forms $Mg_2Si$ and thereby helps to improve the strength after brazing. Silicon, if its content is less than 0.5 percent by mass, may not sufficiently exhibit these effects and may cause an Al—Mn compound to readily precipitate at grain boundary, and this may impair the corrosion resistance. In contrast, if the Si content is more than 1.1 percent by mass, the resulting core material may have a lowered solidus temperature and may thereby melt during brazing. Accordingly the Si content in the core material should be from 0.5 to 1.1 percent by mass.

[Mn in Core Material: 0.6 to 2.0 Percent by Mass]

Manganese (Mn) forms an Al—Mn—Si intermetallic compound with aluminum (Al) and silicon (Si) to thereby improve the strength after brazing, as described above. If the Mn content is less than 0.6 percent by mass, the intermetallic compound may be formed in a smaller number, and silicon (Si) may be dissolved in a larger amount. The resulting core material may have a lowered solidus temperature and may thereby melt during brazing. In contrast, if the Mn content is more than 2.0 percent by mass, a coarse intermetallic compound is formed during casting, and this causes deterioration of the corrosion resistance and formability. Accordingly, the Mn content in the core material should be from 0.6 to 2.0 percent by mass.

[Cu in Core Material: 0.5 to 1.1 Percent by Mass]

Copper (Cu) helps the core material to have a nobler potential to thereby improve the corrosion resistance. If the Cu content is less than 0.5 percent by mass, the resulting core material may have an insufficient difference in potential with respect to the clad material and may thereby show poor corrosion resistance. In contrast, if the Cu content is more than 1.1 percent by mass, the resulting core material may have a lowered solidus temperature and may thereby melt during brazing. Accordingly, the Cu content in the core material should be from 0.5 to 1.1 percent by mass.

[Mg in Core Material: 0.05 to 0.45 Percent by Mass]

Magnesium (Mg) forms $Mg_2Si$ with Si, thus undergoes aging precipitation, and thereby improves the strength after brazing, as described above. Magnesium (Mg), if its content is less than 0.05 percent by mass, may not exhibit this effect sufficiently. In contrast, Mg may lower the flux brazing performance, and, if its content is more than 0.45 percent by mass, Mg may diffuse into the filler material during brazing, and this may lower the brazing performance. Accordingly, the Mg content in the core material should be from 0.05 to 0.45 percent by mass.

[Ti in Core Material: 0.05 to 0.25 Percent by Mass]

Titanium (Ti) forms a Ti—Al compound and disperses as a layer in the Al alloy. The Ti—Al compound has a noble potential and helps corrosion not to proceed in a thickness direction as pitting corrosion but to proceed in a layered form. Titanium, if its content is less than 0.05 percent by mass, may not sufficiently help corrosion to proceed in a layered form; but titanium, if its content is more than 0.25 percent by mass, may form a coarse intermetallic compound to thereby impair the formability and corrosion resistance. Accordingly, the Ti content in the core material should be from 0.05 to 0.25 percent by mass.

The effects according to the present invention are not adversely affected even when the core material further contains Fe, Cr, and/or Zr each in a content of 0.2 percent by mass or less in addition to the above components. The core material may further contain, as inevitable impurities, Zn in a content of 1.5 percent by mass or less; and In and Sn each in a content of 0.03 percent by mass or less.

[Grain Size of Core Material after Brazing: 50 μm or More but Less than 300 μm]

If the core material has a grain size of less than 50 μm after brazing at a temperature of from 580° C. to 610° C. for 3 to 10 minutes, the brazing filler may erode the crystal grain boundary of the core material to cause the erosion of the core material. In contrast, the core material, if having a grain size of more than 300 μm or more, may have reduced strength after brazing. Accordingly, the grain size of the core material after brazing should be 50 μm or more but less than 300 μm in the rolling direction.

[Sheet Thickness of Core Material: 0.3 mm or Less]

If the core material has a sheet thickness of more than 0.3 mm, the aluminum alloy brazing sheet may become unsuitable for forming typically into a component, such as a tube member, of a heat exchanger such as a radiator, because sheet materials used in the aluminum alloy brazing sheet according to the present invention have undergone temper refining to become rigid. The sheet thickness of the core material (sheet thickness after the finish cold rolling step) is therefore preferably 0.3 mm or less. Though not especially limited, the lower limit of the sheet thickness is preferably 0.14 mm or more.

(Clad Material)

The clad material contains Si in a content of more than 0.5 percent by mass but 1.1 percent by mass or less, Mn in a content of 0.01 to 1.7 percent by mass, and Zn in a content of 3.0 to 6.0 percent by mass, with the remainder including aluminum and inevitable impurities. The clad material has a thickness of 25 to 50 μm.

[Si in Clad Material: More than 0.5 Percent by Mass but 1.1 Percent by Mass or Less]

Silicon (Si), if in coexistence with Mn, forms an Al—Mn—Si intermetallic compound that finely disperses in the grains to thereby contribute to improve the strength through dispersion strengthening. This element further contributes to improvement in strength through solid-solution strengthening. Silicon, if its content is less than 0.5 percent by mass, may not sufficiently exhibit these effects and may cause an Al—Mn compound to readily precipitate at grain boundary, and this may impair the corrosion resistance. In contrast, if the Si content is more than 1.1 percent by mass, the clad material may have a lowered solidus temperature and may thereby melt during brazing. Accordingly, the Si content in the clad material should be more than 0.5 percent by mass but 1.1 percent by mass or less.

[Mn in Clad Material: 0.01 to 1.7 Percent by Mass]

Manganese (Mn) forms an Al—Mn—Si intermetallic compound with Al and Si to thereby improve the strength after brazing, as described above. This element also suppresses elemental silicon from precipitating at grain boundary. If the Mn content is less than 0.01 percent by mass, the intermetallic compound may be formed in a smaller number, and the elemental silicon may precipitate at grain boundary. In contrast, if the Mn content is more than 1.7 percent by mass, a coarse intermetallic compound may be formed during casting, and this may impair the corrosion resistance. Accordingly, the Mn content in the clad material should be from 0.01 to 1.7 percent by mass.

[Zn in Clad Material: 3.0 to 6.0 Percent by Mass]

Zinc (Zn) helps the clad material to have a less-noble potential and to thereby act as a sacrificial anode material. If the Zn content is less than 3.0 percent by mass, the clad material may have an insufficient difference in potential with respect to the core material and thereby have poor corrosion resistance. In contrast, if the Zn content is more than 6.0 percent by mass, the clad material may have a lowered solidus temperature and thereby melt during brazing. Accordingly, the Zn content in the clad material should be from 3.0 to 6.0 percent by mass.

The effects according to the present invention are not adversely affected even when the clad material further contains Fe, Cr, and/or Zr each in a content of 0.2 percent by mass or less in addition to the above components. The clad material may further contain, as inevitable impurities, Cu in a content of 0.2 percent by mass or less; and In and Sn each in a content of 0.03 percent by mass or less.

[Thickness of Clad Material: 25 to 50 μm]

The clad material is essential for acting as a sacrificial anode material and ensuring the corrosion resistance of the inner wall in a tube member of a heat exchanger such as a radiator. A clad material, if having a thickness of less than 25 μm, may not contain Zn in a sufficient absolute quantity even when the Zn content falls within the above range. The resulting clad material may not have a potentially sufficiently less noble with respect to the core material and may thereby show poor corrosion resistance. In this connection, the blazing sheet is formed into a tube member, for example, by folding two opposite sides of the brazing sheet inward, and brazing and soldering the edge of the brazing sheet with the surface of the clad material layer to be an inner wall of the tube member. If the clad material has an insufficient thickness in this case, Mg diffused from the core material reacts with a flux applied to the surface of the clad material layer to thereby inhibit the flux from destroying the oxide film; and this impairs the brazing performance at the bonding site. In contrast, if the clad material has a thickness of more than 50 μm, a larger amount of Zn diffuses into the core material; this makes the core material have a less noble potential, and the difference in potential between these layers becomes insufficient; the entire aluminum alloy brazing sheet has a less noble potential and thereby allows the corrosion to proceed at a higher speed, and the aluminum alloy brazing sheet thereby shows poor corrosion resistance. Additionally, such large thickness of the clad material reduces the absolute thickness of the core material to thereby adversely affect the strength after brazing. Accordingly, the thickness of the clad material should be 25 to 50 μm.

(Filler Material)

The filler material contains Si in a content of 7.0 to 12 percent by mass, with the remainder including aluminum and inevitable impurities. The filler material has a thickness of 36 to 55 μm.

[Si in Filler Material: 7.0 to 12 Percent by Mass]

An Al—Si alloy begins to melt at 577° C. or higher, and the resulting liquid phase flows and acts as a brazing filler. If the Si content is less than 7.0 percent by mass, the amount of the brazing filler is insufficient to thereby impair the brazing performance. In contrast, if it is more than 12 percent by mass, an excessively large amount of the brazing filler flows, part of which diffuses into and erodes the core material to cause the erosion of the core material. Accordingly, the Si content in the filler material should be from 7.0 to 12 percent by mass.

The effects according to the present invention are not adversely affected even when the filler material further contains Fe in a content of 0.3 percent by mass or less and/or Ti in a content of 0.05 percent by mass or less in addition to the above components. The filler material may further contain, as inevitable impurities, Zn and Cu each in a content of 2.0 percent by mass or less; and/or In and Sn each in a content of 0.03 percent by mass or less.

[Thickness of Filler Material: 36 to 55 μm]

The Al—Si alloy filler material begins to melt at 577° C. or higher, and the resulting liquid phase acts as a brazing filler and flows, with which a bonding site is filled. If the thickness of the filler material layer is less than 36 μm, Mg diffused from the core material reacts with a flux applied to the surface of the filler material layer to thereby inhibit the flux from destroying the oxide film; and this impairs the brazing performance. In contrast, if it is more than 55 μm, a larger amount of the brazing filler flows, part of which diffuses into and erodes the core material to cause the erosion of the core material. Accordingly, the thickness of the filler material should be 36 to 55 μm.

Next, respective conditions in the method for producing the aluminum alloy brazing sheet, according to the present invention, will be described.

[Homogenization Treatment Step of Core Material: at 440° C. to 570° C. for 4 Hours or Longer]

When an alloy for the core material is merely cast without carrying out a homogenization treatment, elements added to the core material alloy are being segregated. If the core material alloy containing such segregated elements is cladded with a filler material and a sacrificial material, the resulting brazing sheet contains the added elements as being segregated. As a result, the segregation will cause local melting during brazing. The homogenization treatment step is essential for controlling the grain size of the core material after brazing. If a homogenization treatment is performed at a temperature lower than 440° C., the temperature of the core material does not reach 440° C. at the beginning of the hot rolling step and is difficult to be cladded, because the cladding should be performed at a temperature of 440° C. or higher. In contrast, a homogenization treatment, if performed at a temperature of higher than 570° C., may cause an intermetallic compound precipitated in the core material to become coarse, and this may inhibit the growth of crystals which recrystallize in the core material during brazing. A homogenization treatment, if performed for a duration of shorter than 4 hours, may not sufficiently homogenize the core material, and the segregation remains therein. Accordingly, the homogenization treatment step of the core material should be performed at a temperature of from 440° C. to 570° C. for 4 hours or longer.

[Finish Cold Rolling Step: Cold Working Ratio of 20% to 65%]

If finish cold rolling is performed at a cold working ratio of less than 20%, the resulting aluminum alloy brazing sheet may contain residual subgrains, and the brazing filler may diffuse into the residual subgrains during brazing to cause erosion. In contrast, if finish cold rolling is performed at a cold working ratio of more than 65%, the core material may have a grain size of less than 50 μm after the brazing, and the brazing filler thereby diffuses into grain boundary to cause the grain boundary to locally melt (erosion). Accordingly, the cold working ratio in the finish cold rolling step should be from 20% to 65%.

[Finish Annealing Step: at 200° C. to 320° C. for 5 Hours or Shorter]

The finish annealing step is suitable for improving the formability typically of a tube member, because this process softens the material to have improved elongation. Finish annealing, if performed at a temperature of lower than 200° C., may not cause the tube member to be softened sufficiently and may thereby little improve the formability of the tube member. In contrast, finish annealing, if performed at a temperature of higher than 320° C., may cause the material to recrystallize partially, and the working strain applied typically upon the tube member during forming remains as subgrains during brazing, to thereby induce erosion. If finish annealing is performed for a duration of longer than 5 hours, the material may become like a "0" temper material, and subgrains may thereby remain even after brazing to induce erosion. Accordingly, the finish annealing should be performed at a temperature of from 200° C. to 320° C. for 5 hours or shorter, preferably for 2 to 4 hours.

Next, an embodiment of the method for producing the aluminum alloy brazing sheet, according to the present invention, will be illustrated.

Aluminum alloys for clad material and for filler material are respectively subjected to casting, scalping, and homogenization heat treatment (hereinafter referred to as soaking) according to known procedures and thereby yield a clad material slab and a filler material slab. The clad material slab and filler material slab are subjected to hot rolling so as to have predetermined thicknesses and thereby yield a clad material rolled sheet and a filler material rolled sheet. Independently a core material aluminum alloy is subjected to casting and scalping according to known procedures, and then to soaking at a temperature of from 440° C. to 570° C. for 4 hours or longer.

Next, the soaked core material slab is sandwiched between the clad material rolled sheet and the filler material rolled sheet, cladded therewith through hot rolling and hereby yields a sheet material. The sheet material is subjected to cold rolling to a predetermined sheet thickness, then subjected to intermediate annealing and to cold rolling (finish cold rolling) at a cold working ratio of 20% to 65% to a predetermined sheet thickness, and thereby yields a brazing sheet. The intermediate annealing may be performed under common conditions according to whichever of a batch system and a continuous system. However, the intermediate annealing should be performed at a temperature equal to or higher than the recrystallization temperature. It is preferably performed at a temperature of from 350° C. to 400° C. for 2 to 4 hours in a batch system; and is preferably performed at a temperature of from 350° C. to 520° C. for a duration within 10 seconds in a continuous system. After the finish cold rolling, finish annealing at a temperature of from 200° C. to 320° C. for 5 hours or shorter may be carried out.

EXAMPLES

While best modes for carrying out the present invention have been described above, the present invention will be described in further detail with reference to several examples to verify the effects of the present invention in comparison with comparative examples which do not satisfy the conditions specified in the present invention. It should be noted, however, these examples are never construed to limit the scope of the present invention.

(Preparation of Specimens)

Initially, rolled sheets composed of clad material aluminum alloys having the compositions given in Table 2, and rolled sheets composed of filler material aluminum alloys containing Si in the contents given in Tables 3 and 4 were respectively prepared. Independently, core material aluminum alloys having the compositions given in Table 1 were subjected to casting and scalping, then to soaking under the conditions given in Tables 3 and 4. These were sandwiched between the clad material rolled sheet and the filler material rolled sheet in the combinations given in Tables 3 and 4 and were cladded therewith through hot rolling. Next, they were subjected to cold rolling, to intermediate annealing at 380° C. for 3 hours, then to finish cold rolling at the working ratios given in Tables 3 and 4, part of which were further subjected to finish annealing under the conditions given in Tables 3 and 4, thereby yielded specimens each having a three-layered structure.

(Brazing)

An upper part of each specimen was drilled and hanged from a jig, subjected to brazing at 595° C. for 3 minutes and thereby yielded specimens after brazing. The duration within which the samples were held at high temperatures of 380° C. or higher during brazing, including the heat treatment for 3 minutes, was set to 20 minutes. The specimens after brazing were cut into test pieces having predetermined shapes and sizes, and the test pieces were subjected to tensile strength measurements and corrosion tests. In Tables 3 and 4, samples that were unable to be formed into sheets due to problems typically in workability or melting point are indicated as "unevaluatable" in data.

(Measurement of Grain Size of Core Material)

Grain sizes of core materials in the specimens after brazing were measured in the following manner. The specimens after brazing were cut to sizes suitable for the following operations, and were ground from one side to the vicinity of the center in the sheet thickness direction. The ground specimens were etched with an electrolyte, and photographs of the ground faces were taken at a magnification of 100 times. Based on the photographs, the grain size of the core material in the rolling direction was measured according to the section method. An average of measured data at five points was defied as the grain size. The measured data are shown in Tables 3 and 4.

(Measurement of Strength after Brazing)

The strength after brazing was measured in the following manner. Japanese Industrial Standards (JIS) No. 5 test pieces were cut from the specimens after brazing (after one-week aging subsequent to brazing), and the strengths of the test pieces were measured. The measured data are shown in Tables 3 and 4. The acceptability criterion for the strength after brazing was set to 170 MPa or more.

(Evaluation of Brazing Performance)

The brazing performance was evaluated in the following manner. Specimens before brazing were cut into pieces 35 mm long and 20 mm width and formed into two pieces having the shapes shown in FIG. 1, and a non-corrosive flux in an amount of 5 (±0.2) g/m² was applied to surfaces 1a and 1a of the two specimens 1 and 1 facing the filler material, and the surfaces 1a and 1a facing the filler material were superposed as in FIG. 1, and brazing was performed under the specific brazing conditions. The specimens 1 and 1 after brazing were cut out, embedded in a resin, whose cross sections were ground, and the lengths of fillet f (distance between the arrows a-a in FIG. 1: distance between the deepest portion of a dent and the deepest portion of another dent) were measured. Specimens showing a length of fillet f of 4 mm or more were evaluated as having good brazing performance. The evaluations are shown in Tables 3 and 4, in which specimens with good brazing performance are indicated by "Good" and those with poor brazing performance are indicated by "Poor".

(Evaluation of Erosion Resistance)

The erosion resistance was evaluated on the specimens after brazing, and on specimens prepared by further subjecting specimens before brazing to additional cold rolling at a working ratio of 10% or 20%, and then to brazing under the same conditions as in the specimens after brazing. These specimens were cut out, embedded in a resin, whose cross-sections were ground, and the ground faces were observed with a microscope on whether or not erosion of the brazing filler into the core material occurred. The evaluations are shown in Tables 3 and 4, in which specimens showing no erosion are indicated by "Good" and those showing erosion are indicated by "Poor". Specimens showing no erosion at all the three additional cold working ratios were evaluated as being accepted.

(Evaluation of Corrosion Resistance)

The corrosion resistance was evaluated in the following manner. Test pieces 60 mm long and 50 mm wide were cut from the specimens after brazing, and the whole surface of the filler material layer, the whole end faces, the outer periphery 5 mm wide of the surface of the clad material layer were sealed with a seal and a rapid-cure adhesive, so that the surface of the clad material layer be a face to be tested. The test pieces were immersed in an aqueous solution as a corrosion test solution containing 118 ppm of $Na^+$, 58 ppm of $Cl^-$, 60 ppm of $SO_4^{2-}$, 1 ppm of $Cu^{2+}$, and 30 ppm of $Fe^{3+}$, left stand therein at 88° C. for 8 hours and then left stand at ordinary temperature for 16 hours, and this cycle was repeated a total of 90 times. After performing the test, how corrosion occurred was observed. The evaluations are shown in Tables 3 and 4 in which samples showing no perforation corrosion are indicated by "Good", and those showing perforation corrosion are indicated by "Poor". The evaluations of corrosion resistance were performed on specimens which had been accepted in both the brazing performance and erosion resistance evaluations, and specimens which were not evaluated on the corrosion resistance are indicated in data by "-".

TABLE 1

| | Component composition of core material (mass %) | | | | | |
|---|---|---|---|---|---|---|
| No. | Si | Mn | Cu | Mg | Ti | Al** |
| C1 | 0.95 | 1.6 | 0.85 | 0.3 | 0.13 | remainder |
| C2 | 0.95 | 1.6 | 0.85 | 0.32 | 0.13 | remainder |
| C3 | 0.95 | 1.6 | 0.85 | 0.35 | 0.13 | remainder |
| C4 | 0.95 | 1.6 | 0.85 | 0.18 | 0.13 | remainder |
| C5 | 0.95 | 1.6 | 0.85 | 0.2 | 0.13 | remainder |
| C6 | 0.95 | 1.6 | 0.85 | 0.15 | 0.13 | remainder |
| C7 | 0.95 | 1.6 | 0.55 | 0.15 | 0.13 | remainder |
| C8 | 0.8 | 1.2 | 0.55 | 0.2 | 0.08 | remainder |
| C9 | 0.8 | 1.2 | 0.55 | 0.4 | 0.08 | remainder |
| C10 | 0.7 | 0.8 | 0.8 | 0.38 | 0.2 | remainder |
| C11 | 0.7 | 0.8 | 0.8 | 0.2 | 0.2 | remainder |
| C12 | 0.7 | 0.8 | 0.8 | 0.2 | 0.16 | remainder |
| C13 | 0.51 | 0.61 | 0.52 | 0.05 | 0.05 | remainder |
| C14 | 1.08 | 1.95 | 1.09 | 0.44 | 0.16 | remainder |
| C15* | 0.3* | 1.6 | 0.85 | 0.3 | 0.13 | remainder |
| C16* | 1.15* | 1.6 | 0.85 | 0.35 | 0.13 | remainder |
| C17* | 0.95 | 0.55* | 0.55 | 0.3 | 0.13 | remainder |
| C18* | 0.7 | 2.1* | 0.8 | 0.2 | 0.2 | remainder |
| C19* | 0.95 | 1.6 | 0.3* | 0.32 | 0.13 | remainder |
| C20* | 0.95 | 1.6 | 1.15* | 0.32 | 0.13 | remainder |
| C21* | 0.8 | 1.2 | 0.55 | 0.02* | 0.08 | remainder |
| C22* | 0.8 | 1.2 | 0.55 | 0.47* | 0.08 | remainder |
| C23* | 0.95 | 1.6 | 0.85 | 0.35 | 0.02* | remainder |
| C24* | 0.7 | 0.8 | 0.8 | 0.2 | 0.3* | remainder |

*Out of the scope of the present invention
**Including inevitable impurities

TABLE 2

| No. | Si | Mn | Zn | Al** |
|---|---|---|---|---|
| S1 | 0.65 | 0.15 | 4.5 | remainder |
| S2 | 0.85 | 0.95 | 4.5 | remainder |
| S3 | 0.74 | 0.01 | 4.5 | remainder |
| S4 | 0.74 | 0.02 | 4.5 | remainder |
| S5 | 0.55 | 0.3 | 3.5 | remainder |
| S6 | 0.8 | 0.3 | 3.5 | remainder |
| S7 | 0.52 | 0.02 | 3.1 | remainder |
| S8 | 1.08 | 1.67 | 5.9 | remainder |
| S9* | 0.05* | 0.3 | 3.5 | remainder |
| S10* | 1.16* | 0.3 | 3.5 | remainder |
| S11* | 0.74 | 0.0* | 4.5 | remainder |
| S12* | 0.65 | 1.8* | 4.5 | remainder |
| S13* | 0.65 | 0.15 | 2.5* | remainder |
| S14* | 0.65 | 0.15 | 6.5* | remainder |

Component composition of clad material (percent by mass)

*Out of the scope of the present invention
**Including inevitable impurities

TABLE 3

| | | Configuration of brazing sheet | | | | | Production condition | | | | |
|---|---|---|---|---|---|---|---|---|---|---|---|
| | | Core material | | Clad material | | Filler Material | | Core material soaking | | Cold working | Finish annealing | |
| | No. | Component composition No. | Thickness (μm) | Component composition No. | Thickness (μm) | Si content** (mass %) | Thickness (μm) | Temperature (°C.) | Time (h) | ratio (%) | Temperature (°C.) | Time (h) |
| Example | 1 | C4 | 220 | S2 | 40 | 8 | 40 | 565 | 5 | 64 | 250 | 5 |
| | 2 | C4 | 226 | S2 | 30 | 8 | 44 | 570 | 7 | 37 | — | — |
| | 3 | C1 | 164 | S2 | 48 | 8 | 38 | 560 | 8 | 28 | — | — |
| | 4 | C1 | 181 | S2 | 32 | 8 | 37 | 510 | 11 | 26 | — | — |
| | 5 | C2 | 115 | S3 | 35 | 10 | 50 | 450 | 7 | 35 | — | — |
| | 6 | C2 | 117 | S3 | 42 | 10 | 41 | 565 | 5 | 46 | — | — |
| | 7 | C6 | 160 | S4 | 35 | 10 | 55 | 450 | 4 | 21 | 200 | 5 |
| | 8 | C6 | 174 | S4 | 40 | 10 | 36 | 530 | 6 | 58 | — | — |
| | 9 | C3 | 217 | S1 | 30 | 10 | 53 | 520 | 6 | 45 | 320 | 3 |
| | 10 | C3 | 217 | S1 | 38 | 10 | 45 | 440 | 4 | 57 | 270 | 4 |
| | 11 | C5 | 139 | S1 | 25 | 10 | 36 | 510 | 6 | 30 | — | — |
| | 12 | C5 | 97 | S1 | 48 | 10 | 55 | 540 | 5 | 25 | — | — |
| | 13 | C11 | 174 | S1 | 25 | 10 | 51 | 480 | 4 | 50 | — | — |
| | 14 | C11 | 178 | S1 | 33 | 10 | 39 | 480 | 6 | 61 | 320 | 5 |
| | 15 | C10 | 120 | S1 | 40 | 10 | 40 | 470 | 10 | 40 | 230 | 4 |
| | 16 | C10 | 107 | S1 | 50 | 10 | 43 | 470 | 14 | 62 | 290 | 4 |
| | 17 | C9 | 104 | S5 | 49 | 11 | 47 | 500 | 5 | 55 | 200 | 3 |
| | 18 | C9 | 125 | S5 | 27 | 11 | 48 | 500 | 9 | 44 | — | — |
| | 19 | C8 | 223 | S5 | 35 | 11 | 42 | 550 | 5 | 33 | — | — |
| | 20 | C8 | 205 | S5 | 41 | 11 | 54 | 480 | 12 | 38 | — | — |
| | 21 | C13 | 188 | S7 | 26 | 7 | 36 | 560 | 9 | 48 | 210 | 3 |
| | 22 | C13 | 149 | S7 | 49 | 7 | 52 | 500 | 4 | 23 | 200 | 5 |
| | 23 | C14 | 197 | S8 | 48 | 11.9 | 55 | 490 | 4 | 60 | — | — |
| | 24 | C14 | 229 | S8 | 25 | 11.9 | 46 | 540 | 13 | 46 | — | — |

| | | Evaluation | | | | | |
|---|---|---|---|---|---|---|---|
| | | Grain size of core material | Strength after brazing | Brazing | Erosion resistance Additional cold rolling | | | Corrosion |
| | No. | (μm) | (MPa) | performance | 0% | +10% | +20% | resistance |
| Example | 1 | 53 | 190 | Good | Good | Good | Good | Good |
| | 2 | 130 | 181 | Good | Good | Good | Good | Good |
| | 3 | 120 | 221 | Good | Good | Good | Good | Good |
| | 4 | 170 | 225 | Good | Good | Good | Good | Good |
| | 5 | 180 | 218 | Good | Good | Good | Good | Good |
| | 6 | 53 | 220 | Good | Good | Good | Good | Good |
| | 7 | 230 | 182 | Good | Good | Good | Good | Good |
| | 8 | 68 | 195 | Good | Good | Good | Good | Good |
| | 9 | 100 | 228 | Good | Good | Good | Good | Good |
| | 10 | 63 | 230 | Good | Good | Good | Good | Good |
| | 11 | 150 | 195 | Good | Good | Good | Good | Good |
| | 12 | 140 | 186 | Good | Good | Good | Good | Good |
| | 13 | 80 | 180 | Good | Good | Good | Good | Good |
| | 14 | 85 | 185 | Good | Good | Good | Good | Good |
| | 15 | 125 | 230 | Good | Good | Good | Good | Good |
| | 16 | 140 | 225 | Good | Good | Good | Good | Good |
| | 17 | 62 | 229 | Good | Good | Good | Good | Good |
| | 18 | 92 | 245 | Good | Good | Good | Good | Good |
| | 19 | 110 | 184 | Good | Good | Good | Good | Good |
| | 20 | 182 | 181 | Good | Good | Good | Good | Good |
| | 21 | 58 | 177 | Good | Good | Good | Good | Good |

TABLE 3-continued

| | | | | | | |
|---|---|---|---|---|---|---|
| 22 | 210 | 170 | Good | Good | Good | Good | Good |
| 23 | 74 | 242 | Good | Good | Good | Good | Good |
| 24 | 77 | 245 | Good | Good | Good | Good | Good |

**The remainder being Al and inevitable impurities

TABLE 4

| | | Configuration of brazing sheet | | | | | Production condition | | | | |
|---|---|---|---|---|---|---|---|---|---|---|---|
| | | Core material | | Clad material | | Filler material | | Core material soaking | | Cold working | Finish annealing |
| | | Component composition No. | Thickness (μm) | Component composition No. | Thickness (μm) | Si content** (mass %) | Thickness (μm) | Temperature (°C.) | Time (h) | ratio (%) | Temperature (°C.) | Time (h) |
| Comparative Example | 25 | C15* | 181 | S2 | 48 | 8 | 37 | 570 | 7 | 37 | — | — |
| | 26 | C16* | 223 | S1 | 38 | 10 | 39 | 520 | 6 | 45 | 320 | 3 |
| | 27 | C17* | 160 | S2 | 42 | 8 | 48 | 560 | 8 | 28 | — | — |
| | 28 | C18* | 178 | S1 | 33 | 10 | 39 | 490 | 4 | 60 | — | — |
| | 29 | C19* | 126 | S4 | 36 | 10 | 38 | 450 | 7 | 35 | — | — |
| | 30 | C20* | 117 | S3 | 42 | 10 | 41 | 530 | 6 | 58 | — | — |
| | 31 | C21* | 221 | S6 | 29 | 11 | 50 | 550 | 5 | 33 | — | — |
| | 32 | C22* | 125 | S5 | 27 | 11 | 48 | 560 | 9 | 48 | 210 | 3 |
| | 33 | C23* | 217 | S1 | 38 | 10 | 45 | 540 | 5 | 25 | — | — |
| | 34 | C24* | 177 | S1 | 30 | 10 | 43 | 480 | 4 | 50 | — | — |
| | 35 | C9 | 119 | S9* | 35 | 11 | 46 | 500 | 5 | 55 | 200 | 3 |
| | 36 | C9 | 125 | S10* | 27 | 11 | 48 | 550 | 6 | 35 | 210 | 4 |
| | 37 | C7 | 165 | S11* | 45 | 10 | 40 | 450 | 4 | 21 | 200 | 5 |
| | 38 | C3 | 217 | S12* | 38 | 10 | 45 | 480 | 5 | 25 | 220 | 5 |
| | 39 | C5 | 133 | S13* | 31 | 11 | 36 | 510 | 6 | 30 | — | — |
| | 40 | C11 | 178 | S14* | 33 | 10 | 39 | 530 | 4 | 40 | — | — |
| | 41 | C2 | 139 | S3 | 20* | 10 | 41 | 490 | 6 | 30 | — | — |
| | 42 | C1 | 110 | S2 | 53* | 8 | 37 | 560 | 5 | 50 | — | — |
| | 43 | C4 | 218 | S2 | 40 | 6* | 42 | 565 | 5 | 64 | 250 | 5 |
| | 44 | C12 | 123 | S1 | 34 | 13* | 43 | 470 | 10 | 40 | 230 | 4 |
| | 45 | C2 | 124 | S3 | 42 | 10 | 34* | 450 | 6 | 45 | — | — |
| | 46 | C1 | 110 | S2 | 32 | 8 | 58* | 480 | 5 | 28 | 250 | 3 |
| | 47 | C2 | 117 | S3 | 42 | 10 | 41 | 400* | 6 | 30 | — | — |
| | 48 | C1 | 181 | S2 | 32 | 8 | 37 | 580* | 4 | 35 | 200 | 3 |
| | 49 | C2 | 117 | S3 | 42 | 10 | 41 | 480 | 5 | 15* | — | — |
| | 50 | C1 | 181 | S2 | 32 | 8 | 37 | 510 | 6 | 70* | 260 | 4 |

| | | Evaluation | | | | | |
|---|---|---|---|---|---|---|---|
| | | Grain size of core material | Strength after brazing | Brazing | Erosion resistance Additional cold rolling | | | Corrosion |
| | No. | (μm) | (MPa) | performance | 0% | +10% | +20% | resistance |
| Comparative Example | 25 | 130 | 215 | Good | Good | Good | Good | Poor |
| | 26 | | | (unevaluatable) | | | | |
| | 27 | 120 | 215 | Good | Poor | Poor | Poor | — |
| | 28 | 74 | 190 | Good | Good | Good | Good | Poor |
| | 29 | 180 | 220 | Good | Good | Good | Good | Poor |
| | 30 | | | (unevaluatable) | | | | |
| | 31 | 110 | 165 | Good | Good | Good | Good | Good |
| | 32 | 58 | 238 | Poor | Good | Good | Good | — |
| | 33 | 140 | 223 | Good | Good | Good | Good | Poor |
| | 34 | 80 | 191 | Good | Good | Good | Good | Poor |
| | 35 | 62 | 230 | Good | Good | Good | Good | Poor |
| | 36 | | | (unevaluatable) | | | | |
| | 37 | 230 | 180 | Good | Good | Good | Good | Poor |
| | 38 | 195 | 223 | Good | Good | Good | Good | Poor |
| | 39 | 150 | 192 | Good | Good | Good | Good | Poor |
| | 40 | | | (unevaluatable) | | | | |
| | 41 | 180 | 231 | Poor | Good | Good | Good | — |
| | 42 | 68 | 214 | Good | Good | Good | Good | Poor |
| | 43 | 53 | 183 | Poor | Good | Good | Good | — |
| | 44 | 125 | 188 | Good | Poor | Poor | Poor | — |
| | 45 | 112 | 219 | Poor | Good | Good | Good | — |
| | 46 | 200 | 227 | Poor | Poor | Poor | Poor | — |
| | 47 | | | (unevaluatable) | | | | |

TABLE 4-continued

| | | | | | | | | |
|---|---|---|---|---|---|---|---|---|
| 48 | 40* | 225 | Poor | Poor | Poor | Good | — |
| 49 | 310* | 220 | Poor | Poor | Good | Good | — |
| 50 | 45* | 235 | Poor | Poor | Poor | Poor | — |

*Out of the scope of the present invention
**Including inevitable impurities

Examples 1 to 24 each have a grain size of the core material after brazing being controlled within a range of 50 μm or more but less than 300 μm and are good in all the strength after brazing, brazing performance, erosion resistance, and corrosion resistance, because the configurations of the aluminum alloy brazing sheets (contents of respective elements of the core material; contents of respective elements and thickness of the clad material; and Si content and thickness of the filler material) and production conditions (soaking temperature of the core material; and cold working ratio) are all within ranges specified in the present invention.

(Evaluation on Core Material Composition)

Comparative Example 25 had an insufficient Si content of the core material and showed poor corrosion resistance due to precipitation of an Al—Mn compound at grain boundary. In contrast, Comparative Example 26 had an excessive Si content of the core material, whereby the specimen melted during brazing and failed to give a specimen after brazing.

Comparative Example 27 had an insufficient Mn content of the core material and thereby suffered from erosion due to decreased amount of an Al—Mn—Si intermetallic compound and an increased content of dissolved Si in the core material. In contrast, Comparative Example 28 had an excessive Mn content of the core material and thereby suffered from insufficient corrosion resistance due to the formation of a coarse Mn compound.

Comparative Example 29 had an insufficient Cu content of the core material and thereby showed poor corrosion resistance due to insufficient difference in potential with respect to the clad material. In contrast, Comparative Example 30 had an excessive Cu content of the core material, the specimen thereby melted during brazing and failed to give a specimen after brazing.

Comparative Example 31 had an insufficient Mg content of the core material and thereby showed a low strength after brazing. In contrast, Comparative Example 32 had an excessive Mg content of the core material and thereby showed poor brazing performance.

Comparative Example 33 had an insufficient Ti content of the core material, thereby insufficiently made corrosion proceed in a layer form, and showed poor corrosion resistance. In contrast, Comparative Example 34 had an excessive Ti content of the core material and thereby showed poor corrosion resistance due to the formation of a coarse Ti compound.

(Evaluation on Clad Material Composition)

Comparative Example 35 had an insufficient Si content of the clad material and thereby showed poor corrosion resistance due to the precipitation of an Al—Mn compound at grain boundary. In contrast, Comparative Example 36 had an excessive Si content of the clad material, the specimen thereby melted during brazing, and failed to give a specimen after brazing.

Comparative Example 37 had an insufficient Mn content (not added) in the clad material and thereby showed poor corrosion resistance due to the precipitation of elemental silicon at grain boundary. In contrast, Comparative Example 38 had an excessive Mn content of the clad material and thereby showed poor corrosion resistance due to the formation of a coarse Mn compound.

Comparative Example 39 had an insufficient Zn content of the clad material and thereby showed poor corrosion resistance due to insufficient difference in potential with respect to the core material. In contrast, Comparative Example 40 had an excessive Zn content of the clad material, the specimen thereby melted during brazing and failed to give a specimen after brazing.

(Evaluation on Thickness of Clad Material)

Comparative Example 41 had an insufficient thickness of the clad material and thereby showed poor corrosion resistance due to an insufficient difference in potential with respect to the core material. It also showed poor brazing performance due to Mg diffused from the core material. In contrast, Comparative Example 42 had an excessively large thickness of the clad material, thereby had a less noble potential as a whole, and showed poor corrosion resistance due to a faster corrosion speed.

(Evaluation on Si Content of Filler Material)

Comparative Example 43 had an insufficient Si content of the filler material and thereby showed poor brazing performance due to insufficient flow of the brazing filler. In contrast, Comparative Example 44 had an excessive Si content of the filler material and suffered from erosion due to excessive flow of the brazing filler.

(Evaluation on Thickness of Filler Material)

Comparative Example 45 had an insufficient thickness of the filler material and thereby showed poor brazing performance due to insufficient flow of the brazing filler. In contrast, Comparative Example 46 had an excessive thickness of the filler material and thereby suffered from erosion due to excessive flow of the brazing filler.

(Evaluation on Homogenization Treatment Temperature of Core Material)

In Comparative Example 47, the core material was subjected to homogenization treatment at an excessively low temperature, and thereby failed to reach such a temperature as to be claddable in hot rolling, failed to be cladded by compression bonding, and failed to give a specimen. In contrast, in Comparative Example 48, the core material was subjected to homogenization treatment at an excessively high temperature, thereby had an excessively small grain size to cause erosion, wherewith Si in the filler material diffused into the core material to decrease the flow of the brazing filler, and the resulting specimen showed poor brazing performance.

(Evaluation on Cold Working Ratio)

Comparative Example 49 was subjected to cold rolling at an excessively low cold working ratio and thereby suffered from erosion due to residual subgrains, in which crystals in the core material became coarse. In contrast, Comparative Example 50 was subjected to cold rolling at an excessively high cold working ratio and thereby suffered from erosion due to an excessively small grain size of the core material. Both Comparative Examples 49 and 50 suffered from poor brazing performance, because Si in the filler material diffused into the core material accompanied with the erosion to thereby decrease the flow of the brazing filler.

The invention claimed is:

1. An aluminum alloy brazing sheet comprising:
a core material comprising Si in a content of 0.5 to 1.1 percent by mass, Mn in a content of 0.6 to 2.0 percent by mass, Cu in a content of 0.5 to 1.1 percent by mass, Mg in a content of 0.05 to 0.45 percent by mass, and Ti in a content of 0.05 to 0.25 percent by mass, with the remainder including aluminum and inevitable impurities;
a clad material lying on one side of and in direct contact with the core material, having a thickness of from 25 to 50 μm, and comprising Si in a content of more than 0.5 percent by mass but 1.1 percent by mass or less, Mn in a content of 0.01 to 0.95 percent by mass, and Zn in a content of 3.0 to 6.0 percent by mass, with the remainder including aluminum and inevitable impurities; and
a filler material lying on the other side of and in direct contact with the core material, having a thickness of from 36 to 55 μm, and comprising Si in a content of 7.0 to 12 percent by mass, with the remainder including aluminum and inevitable impurities,
wherein the core material has a grain size of 50 μm or more but less than 300 μm in a rolling direction after the aluminum alloy brazing sheet is subjected to a heat treatment at a temperature of 380° C. or higher for 20 minutes, which includes brazing at a temperature of 595° C. for 3 minutes, and
wherein the aluminum alloy brazing sheet has a tensile strength after the brazing at 595° C. for 3 minutes of at least 170 MPa.

2. A method for producing the aluminum alloy brazing sheet according to claim 1, wherein the method comprises:
a homogenization treatment for homogenizing a slab for the core material through a heat treatment at a temperature of 440° C. to 570° C. for 4 hours or longer;
a hot rolling for cladding the core material slab obtained in the homogenization treatment with a rolled sheet for the clad material and with a rolled sheet for the filler material through hot rolling;
a cold rolling for rolling the hot rolled sheet of a laminate structure obtained in the hot rolling to a predetermined sheet thickness through cold working;
an intermediate annealing for annealing the rolled sheet of a laminate structure obtained in the cold rolling; and
a finish cold rolling for rolling the rolled sheet of a laminate structure after the intermediate annealing at a cold working ratio of 20% to 65% to a sheet thickness of 0.3 mm or less through cold working.

3. The method for producing the aluminum alloy brazing sheet according to claim 2, wherein the method further comprises:
a finish annealing for annealing the sheet at a temperature of 200° C. to 320° C. for 5 hours or shorter after the finish cold rolling.

4. The aluminum alloy brazing sheet according to claim 1, which is produced by a method comprising:
a homogenization treatment for homogenizing a slab for the core material through a heat treatment at a temperature of 440° C. to 570° C. for 4 hours or longer;
a hot rolling for cladding the core material slab obtained in the homogenization treatment with a rolled sheet for the clad material and with a rolled sheet for the filler material through hot rolling;
a cold rolling for rolling the hot rolled sheet of a laminate structure obtained in the hot rolling to a predetermined sheet thickness through cold working;
an intermediate annealing for annealing the rolled sheet of a laminate structure obtained in the cold rolling; and
a finish cold rolling for rolling the rolled sheet of a laminate structure after the intermediate annealing at a cold working ratio of 20% to 65% to a sheet thickness of 0.3 mm or less through cold working.

5. The aluminum alloy brazing sheet according to claim 4, wherein the method further comprises:
a finish annealing for annealing the sheet at a temperature of 200° C. to 320° C. for 5 hours or shorter after the finish cold rolling.

6. An aluminum alloy brazing sheet comprising only the following three layers:
a core material comprising Si in a content of 0.5 to 1.1 percent by mass, Mn in a content of 0.6 to 2.0 percent by mass, Cu in a content of 0.5 to 1.1 percent by mass, Mg in a content of 0.05 to 0.45 percent by mass, and Ti in a content of 0.05 to 0.25 percent by mass, with the remainder including aluminum and inevitable impurities;
a clad material lying on one side of the core material, having a thickness of from 25 to and comprising Si in a content of more than 0.5 percent by mass but 1.1 percent by mass or less, Mn in a content of 0.01 to 0.95 percent by mass, and Zn in a content of 3.0 to 6.0 percent by mass, with the remainder including aluminum and inevitable impurities; and
a filler material lying on the other side of the core material, having a thickness of from 36 to 55 μm, and comprising Si in a content of 7.0 to 12 percent by mass, with the remainder including aluminum and inevitable impurities,
wherein the core material has a grain size of 50 μm or more but less than 300 μm in a rolling direction after the aluminum alloy brazing sheet is subjected to a heat treatment at a temperature of 380° C. or higher for 20 minutes, which includes brazing at a temperature of 595° C. for 3 minutes, and
wherein the aluminum alloy brazing sheet has a tensile strength after the brazing at 595° C. for 3 minutes of at least 170 MPa.

* * * * *